No. 684,412. Patented Oct. 15, 1901.
J. M. DAVIDSON.
FILTER STRAINER.
(Application filed July 10, 1901.)
(No Model.) 3 Sheets—Sheet 1.
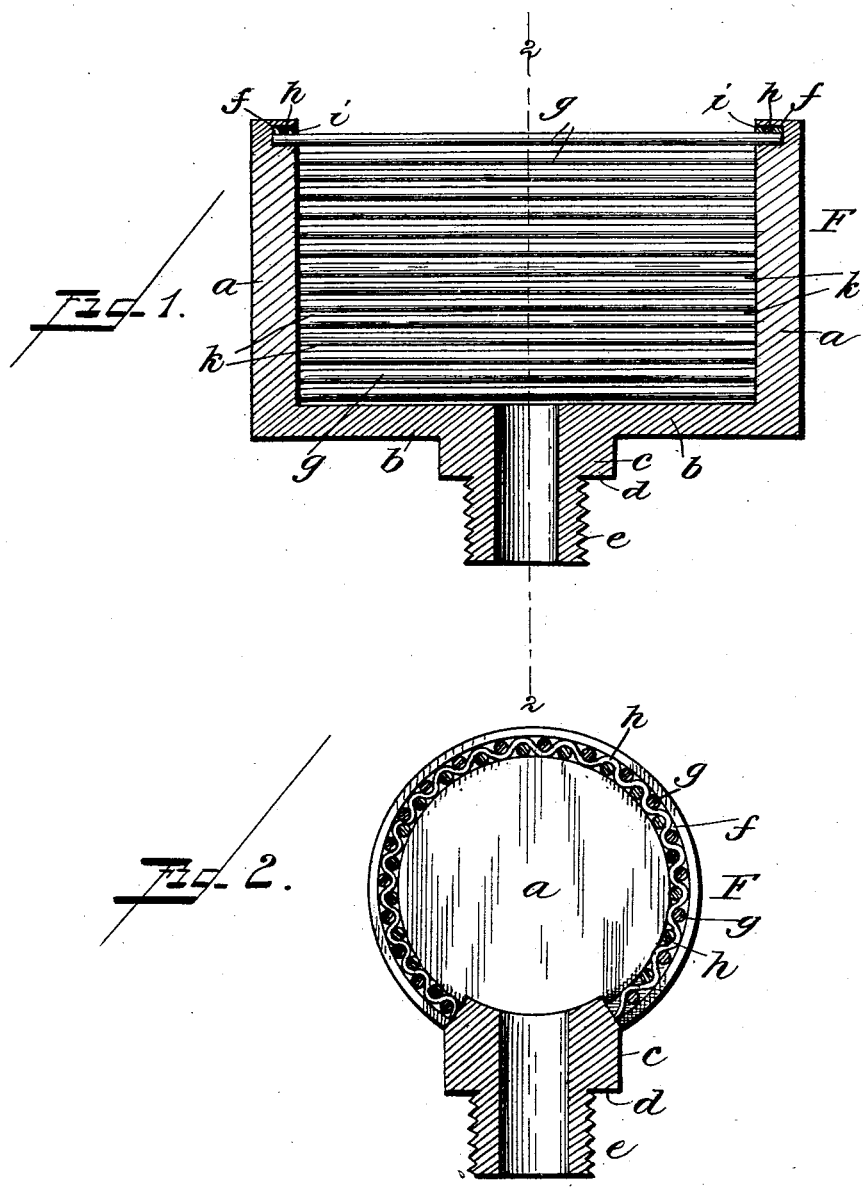

No. 684,412. Patented Oct. 15, 1901.
J. M. DAVIDSON.
FILTER STRAINER.
(Application filed July 10, 1901.)
(No Model.) 3 Sheets—Sheet 2.
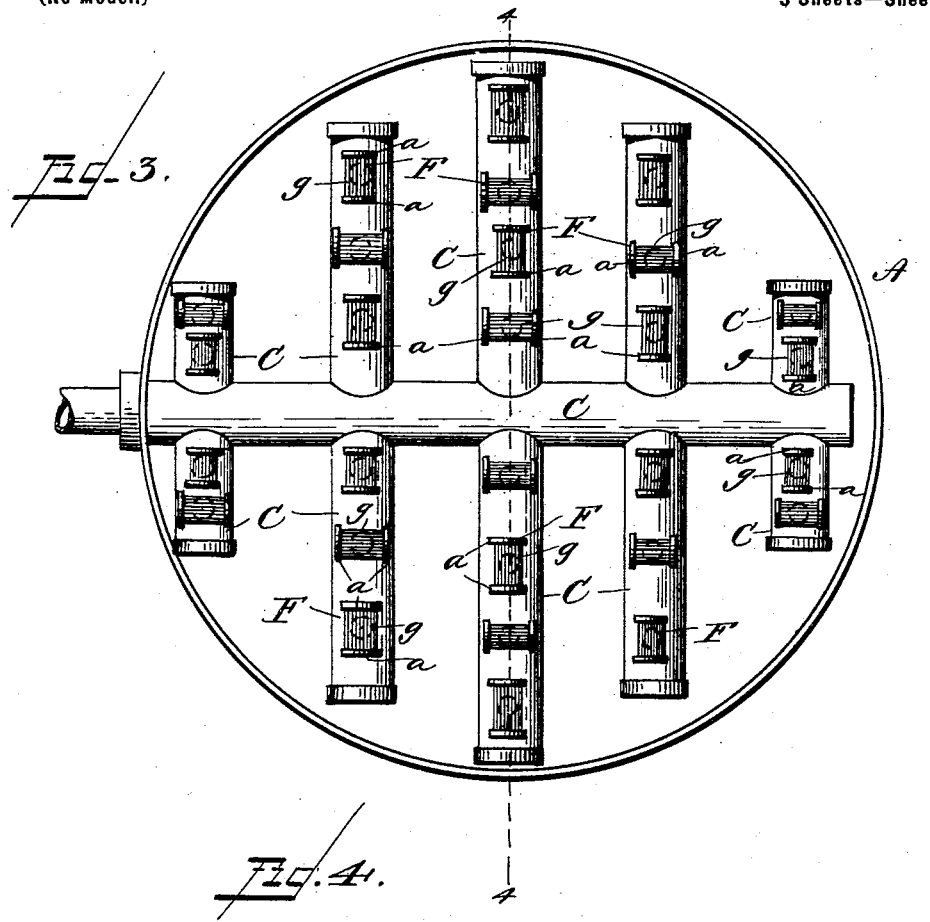
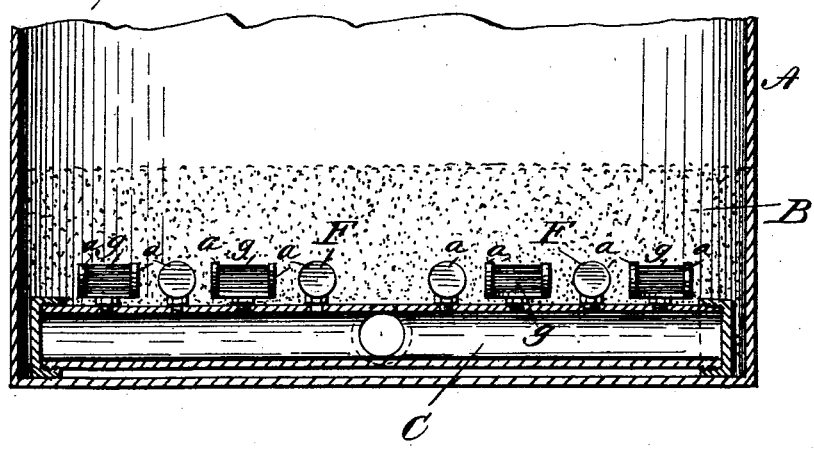
Witnesses: Franck L. Ourand. W. Parker Reinohl.
Inventor John M. Davidson. by D. G. Reinohl Attorney No. 684,412. Patented Oct. 15, 1901.
J. M. DAVIDSON.
FILTER STRAINER.
(Application filed July 10, 1901.)
(No Model.) 3 Sheets—Sheet 3.
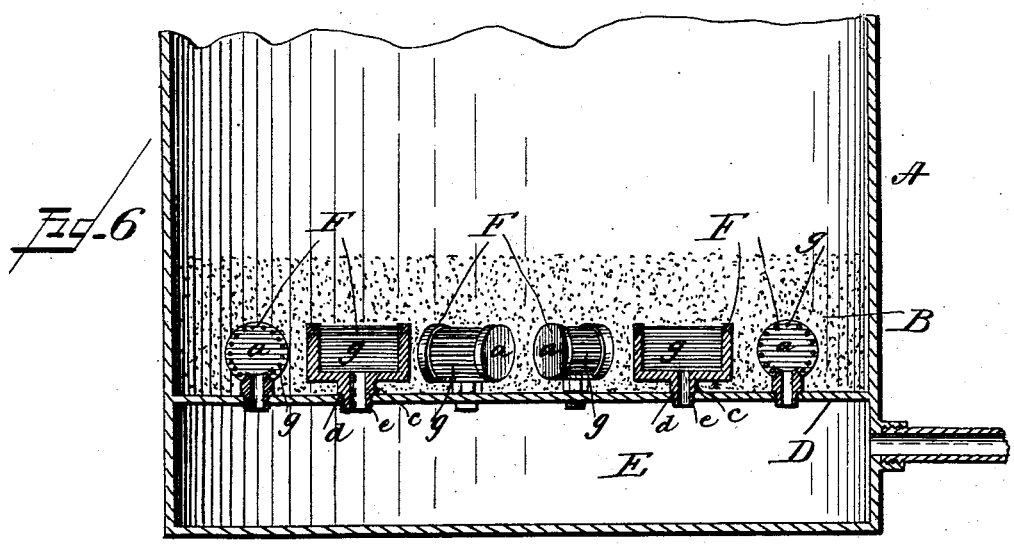
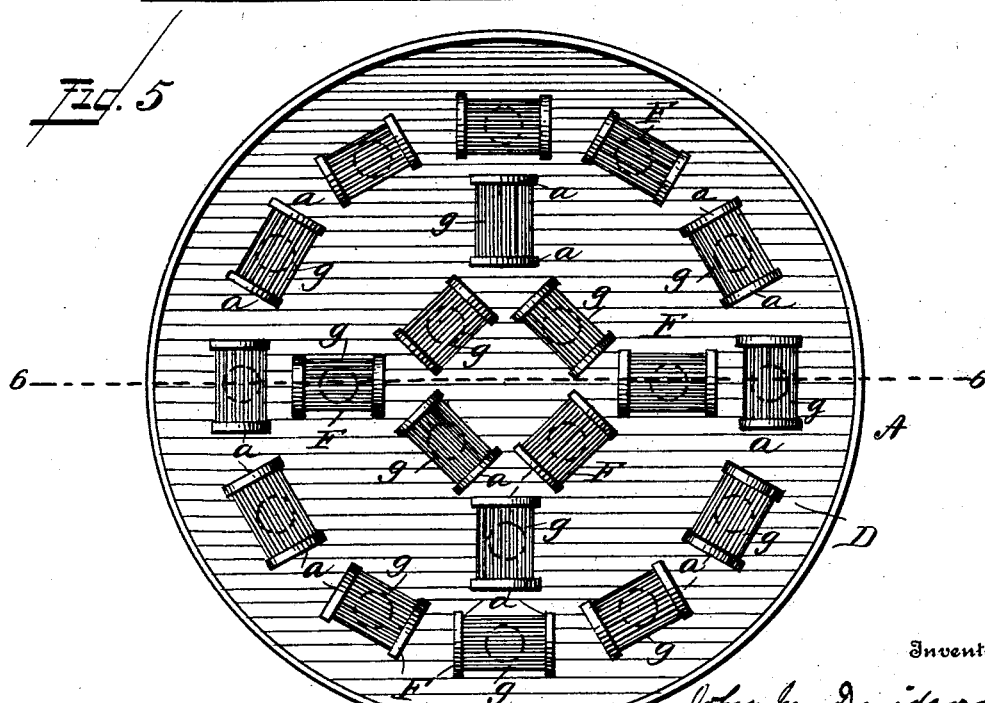

UNITED STATES PATENT OFFICE.

JOHN M. DAVIDSON, OF ALLEGHENY, PENNSYLVANIA, ASSIGNOR TO JAMES VERNER SCAIFE, OF SAME PLACE.

FILTER-STRAINER.

SPECIFICATION forming part of Letters Patent No. 684,412, dated October 15, 1901.

Application filed July 10, 1901. Serial No. 67,772. (No model.)

*To all whom it may concern:*

Be it known that I, JOHN M. DAVIDSON, a citizen of the United States, residing at Allegheny, in the county of Allegheny and State of Pennsylvania, have invented certain new and useful Improvements in Filter-Strainers; and I do hereby declare the following to be a full, clear, and exact description of the invention, such as will enable others skilled in the art to which it appertains to make and use the same.

My invention relates to filters in which a granular bed is used for arresting the impurities contained in water or other liquid, has especial reference to strainers used for the twofold purpose of receiving or collecting water from the filter-bed as it percolates therethrough and discharging water into the filter-bed for cleansing it, and consists in cercertain improvements in construction, which will be fully disclosed in the following specification and claims.

In the accompanying drawings, which form part of this specification, Figure 1 represents a vertical longitudinal section of the strainer detached; Fig. 2, a transverse section on line 2 2, Fig. 1; Fig. 3, a plan of a filter having distributing-pipes provided with my improved strainer; Fig. 4, a vertical transverse section of the same on line 4 4, Fig. 3; Fig. 5, a plan of a filter having a bottom on which the filter-bed rests and to which bottom the strainers are attached and a filtered-water chamber below the filter-bed; and Fig. 6, a vertical transverse section of the same on line 6 6, Fig. 5.

Reference being had to the drawings and the letters thereon, A indicates a filter, B the granular filter-bed, C distributing-pipes, D a bottom on which the filter-bed rests, and E a filtered-water chamber, all of which may be of any approved form of construction.

F indicates the strainer, which is provided with heads $a\ a$ at opposite ends connected by a bar $b$, (see Fig. 1,) from which extends a neck $c$, having a shoulder $d$ and a screw-threaded extension $e$, by which the strainer is connected or attached to the distributing-pipes C or to the bottom D. In each head $a$ is a groove $f$, in which the ends of the round rods $g$ extend, and the rods are spaced to provide for ingress and egress of water by a wire $h$, intertwined between the rods to separate and secure them in their separated position. The grooves $f$ and the rods $g$ extend from the sides of the bar $b$ of the body of the strainer throughout the remainder of the body of the strainer, as shown in Figs. 1 and 2, and after the rods have been inserted in the body the grooves $f$ are preferably filled with solder, as shown at $i$ in Fig. 1.

The spaces $k$ between the rods $g$ regulate the thickness and the efficiency of the sheets of water projected into the filter-bed for loosening the particles thereof and cleansing them by attrition, and by extending the rods down on each side of the strainer below the vertical center of the body that portion of the strainer only which is above the center is subject to the weight of the filter-bed, while the part of the bed below the center does not pack so hard as that above it and is more easily moved when the current of water is reversed to cleanse the filter-bed.

To secure thorough loosening and agitation of the particles of the filter-bed and the more ready loosening thereof, the strainers are arranged concentrically and set at different angles on the distributing-pipes C or on the bottom D, by which the streams or sheets of water issuing from between the rods $g$ of the strainers are crossed and effectually tear up the filter-bed and produce violent agitation of the granules, which frees all foreign matter lodged in the bed and cleanses the granules by attrition, and every particle or all the granules of the filter-bed are dislodged and set in motion for cleansing.

Having thus fully described my invention, what I claim is—

1. A filter-strainer having a head at each end, a bar connecting said heads, a neck on said bar for attaching the strainer, and rods between said heads extending from the sides of said bar around the strainer.

2. A filter-strainer having a head at each end provided with a groove, a bar on the lower side of the strainer connecting said heads, a neck on the bar for attaching the strainer, rods between the heads extending from the sides of the bar around the strainer, and wire interwoven between the ends of the rods.

3. A filter provided with means for supplying water thereto, and strainers, having a head at each end, a bar connecting said heads, a neck on said bar, and rods between said heads extending below the vertical center of the strainer, set at different angles and communicating with the water-supply, whereby the streams or sheets of water issuing from the strainers are crossed, the entire area of the filter permeated by the streams and the particles of the bed loosened, raised, and cleansed.

In testimony whereof I affix my signature in presence of two witnesses.

JOHN M. DAVIDSON.

Witnesses:
A. FRAZER LEGGATE,
H. T. MORRIS.